United States Patent

[11] 3,622,693

[72] Inventors Robert R. Del Ciello
Elmwood Park;
Francis H. Hilbert, River Grove, both of Ill.

[21] Appl. No. 38,015
[22] Filed May 18, 1970
[45] Patented Nov. 23, 1971
[73] Assignee Motorola, Inc.
Franklin Park, Ill.

[54] MODULATOR CIRCUIT HAVING UTILITY IN VIDEO RECORDING
10 Claims, 3 Drawing Figs.

[52] U.S. Cl. ........................................................ 178/5.4 CD, 178/6.6 A, 179/15 AW, 332/40
[51] Int. Cl. ........................................................ H04n 5/76, H04j 3/00
[50] Field of Search ........................................... 178/5.4 CD, 5.4 R, 6.6 R, 6.6 A, 6.7 R, 6.7 A; 179/15 AW, 15 AT; 332/21, 40; 325/39, 142

[56] References Cited
UNITED STATES PATENTS

| | | | |
|---|---|---|---|
| 2,982,923 | 5/1961 | Hibbard ........................ | 179/15 AW |
| 3,042,754 | 7/1962 | McManis........................ | 179/15 AW |
| 3,124,750 | 3/1964 | McLean et al. ................ | 179/15 AW |

*Primary Examiner*—Robert L. Richardson
*Attorney*—Mueller & Aichele

ABSTRACT: A color signal modulator encodes or modulates two channels of color signal information as pulse-width modulated, time-division-multiplexed pulses to produce an input signal for an electronic video-recording (EVR) system. At predetermined intervals, a phase-synchronizing sequence is provided by modulation of the pulse widths of the two channels in the form of maximum width modulation in one channel, alternating with no information in the other channel, the pattern being repeated a preestablished number of times.

INVENTORS
ROBERT R. DEL CIELLO
FRANCIS H. HILBERT
BY
Mueller & Aichele ATTYS.

MODULATOR CIRCUIT HAVING UTILITY IN VIDEO RECORDING

BACKGROUND OF THE INVENTION

A number of different systems exist for recording image or picture information for subsequent readout and reproduction. Among such systems are systems which record the image information on magnetic tape, which is subsequently scanned for readout in reproduction. In addition, photographic film is utilized as a record medium, and systems have been produced to scan images recorded on such film, either in monochromatic form or in actual colors, by the raster of a cathode ray tube which permits generation of cyclic signals to represent the video information. Coding of the signals to represent color information is, of course, an advantage over using actual images since making such a recording is rendered less costly and the permanence of the recording can be enhanced since no longer is it necessary to record the actual color images.

Color signal-coding systems of the past have presented problems of minimizing the effect of record imperfections and of deriving relatively stable hue information from the record. Complete color information recording must include color information represented by two signals, each a function of hue and saturation. Multiplex recording and decoding to accomplish this, however, often present difficulties in avoiding crosstalk or interference between the different sets of color image information.

An additional problem sometimes experienced in prior image-recording processes, has been the matching of the record characteristic and the recorded signals; so that the information can be derived with accuracy as to amplitude and linerarity or faithful reproduction of color images.

An electronic video recording (EVR) system for color information has been proposed using a combination of pulse-width modulation and time-division multiplex for conveying the color saturation and hue information. In this system, an on-off light transfer characteristic is utilized together with signal clipping on the chroma channel in the EVR player to produce the necessary width-modulated signals from a film which has the color information recorded as only two levels, opaque and clear. Within each time division multiplex interval, the color saturation information for the hue represented by the interval or channel is encoded in the form of a width-modulated pulse, the modulation being on the trailing edge only. Alternating time division multiplex intervals correspond to the two different hues necessary for conveying the color information. To produce an input signal from a color T V camera suitable for controlling the exposure of the film to produce the width-modulated input signals from the outputs of two color channels of a color television camera, it is necessary to convert the analog color output signals to pulse-width modulated signals and to multiplex the signals for the two different channels.

SUMMARY OF THE INVENTION

Accordingly it is an object of this invention to provide an improved signal modulator circuit.

It is an additional object of this invention to produce pulse-width modulated, time-division-multiplexed pulses in response to analog signals on at least first and second channels.

It is a further object of this invention convert analog information in two color information channels into a sequence of pulse-width modulated, time-division-multiplexed pulses, representative of the hue and saturation of the respective channels.

Accordingly, a modulator for producing pulse-width modulated, time-division-multiplexed pulses from first and second sources of signals includes first and second comparator circuits responsive to the signals from the first and second sources, respectively, with the comparator circuits also being supplied with a reference input signal to produce a first output therefrom with the input signals to produce a first output therefrom with the input signals having a predetermined relationship with the reference signal and to switch to a second output upon the attainment of a second predetermined relationship between the corresponding input signal and the reference signal. The comparator circuits are rendered alternately responsive to the input signals by a control circuit, operated by a clock signal at a predetermined frequency, to render the first and second comparator circuits alternately operative. The reference signal applied to the first and second comparator circuits is varied from an initial value at the beginning of each pulse interval as determined by the clock signals at a predetermined rate toward a final value to cause the relative duration of the first and second outputs from the comparator circuit rendered operative during any given pulse interval to be varied in accordance with the magnitude of the input signal. The outputs of the first and second comparator circuits are then combined to produce the desired pulse-width modulated, time-division-multiplexed pulse train.

DETAILED DESCRIPTION

Figure 1:
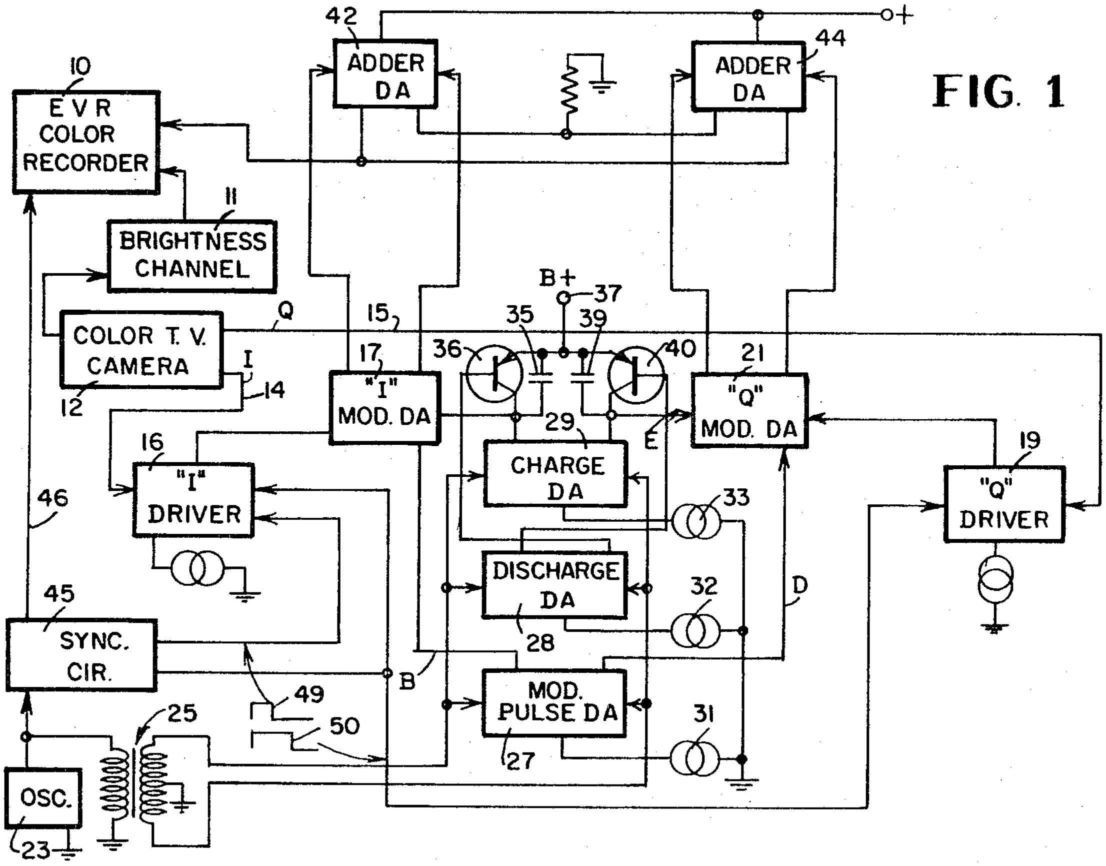
FIG. 1 is a block diagram of a preferred embodiment of the invention.

Referring now to FIG. 1, there is shown a block diagram of a preferred embodiment of a color signal-modulating system for use in supplying pulse-width modulated, time-division-multiplexed pulses, indicative of the hue and saturation of color information on two color channels to an EVR color recorder 10. This color information is recorded simultaneously with corresponding brightness information received by the recorder 10 over a brightness channel 11 from a color television camera 12. The color television camera 12 produces two channels of color information, which for purposes of this illustration may be designated the "I" and "Q" channels, on two output leads 14 and 15, respectively.

Since the "I" and "Q" color information obtained from the camera 12 is an analog signal of a substantially randomly varying DC level, it is necessary to convert this signal, the level of which represents the saturation of the color information on the respective channel, into a form to which the EVR recorder 10 responds to produce the film bearing the color-coded information. To accomplish this, the "I" color information signals appearing on the lead 14 are applied through an "I" driver circuit 16, the output of which is applied to the signal input of an "I" modulating differential amplifier 17. Similarly, the signals present on the "Q" output lead 15 are applied through a "Q" driver circuit 19, the output of which is connected to the signal input of a "Q" modulating differential amplifier 21.

In order to produce the signals in a time-division-multiplexed form for supply to the EVR color recorder 10, it is necessary to control the operation of the two modulating differential amplifiers 17 and 21 to cause the outputs of these differential amplifiers to produce the modulating signals alternately as a sequence of time-division-multiplexed pulses. This control is effected by a master frequency oscillator 23, the frequency of which is an integral multiple of the horizontal line frequency of a conventional television receiver. Thus, the frequency of the oscillator 23 is a multiple of 3.58 megacycles, with the particular frequency being dependent upon the number of samples of the "I" and "Q" color information which are to be recorded for each line of the horizontal scan by the EVR recorder 10.

Figure 2:
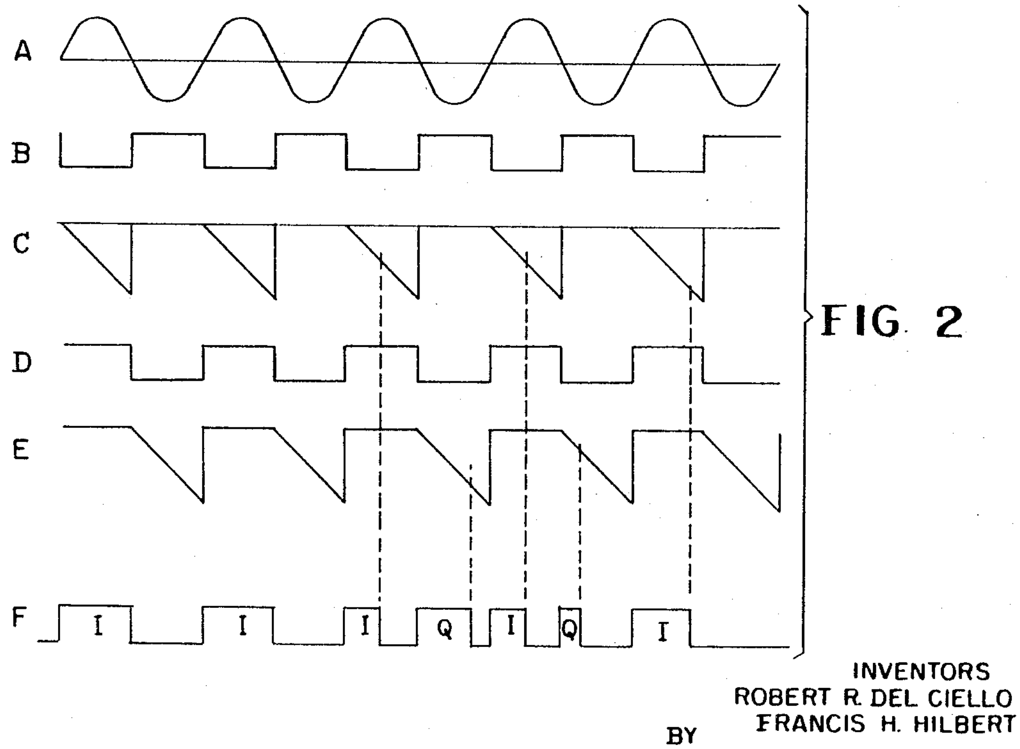
FIG. 2 illustrates waveforms useful in describing the operation of the circuit shown in FIG. 1.

The output of the oscillator 23 is substantially in the form of a sine wave output, shown as waveform A of FIG. 2, and is applied to the primary winding of a transformer 25, the two ends of the secondary winding of which are connected to opposite inputs of three differential amplifier switch circuits 27, 28 and 29. Since the signals applied to the respective inputs of the differential amplifiers 27 to 29 are of opposite phases, these differential amplifier switches change state each half-cycle of the waveform A appearing on the secondary winding 25.

The waveforms B and D of FIG. 2 represent the simultaneous states of the two different outputs of each of the differential amplifiers 27–29. The negative portions of these waveforms indicate that the particular outputs represented thereby are coupled through a conductive circuit element in the differential amplifier to the corresponding one of three current sources 31, 32 and 33. Similarly, the positive portions of the waveforms B and D indicate that the element of the differential amplifier providing the respective output is nonconductive or off, operating substantially as an open switch between that output and the corresponding current source 31–33.

The differential amplifier 27 is the modulating pulse differential amplifier which controls the time-division-multiplexing operation of the differential amplifiers 17 and 21. The left-hand output of the differential amplifier 27 is connected as the current source for the differential amplifier 17, and the right-hand output of the amplifier 27 provides the current source for the differential amplifier 21. Thus, whenever the left-hand output of the differential amplifier 27 operates as a closed switch between the current source 31 and the differential amplifier 17, the differential 17 is enabled for operation to produce an output indicative of the input signals applied to it by the driver 16.

Similarly, whenever the differential amplifier 27 operates as a closed switch between the current source 31 and the differential amplifier 21, the amplifier 21 is enabled for operation to produce an output signal indicative of the signals applied to its signal input by the driver 19. Whenever either of the differential amplifiers 17 or 21 is enabled by the differential amplifier 27 to provide output signals, the other of these differential amplifiers is rendered inoperative, since the modulating pulse differential amplifier 27 operates substantially as an open switch between such other differential amplifier 17 or 21 and the current source 31.

The differential amplifiers 28 and 29 operate to control the reference voltage applied to the modulating differential amplifiers 17 and 21, so that the outputs of the differential amplifiers 17 and 21 are in the form of pulse-width modulations, with the width of the pulses being indicative of the amplitude of the input signals obtained from the respective drivers 16 and 19 during the time interval that the corresponding differential amplifier 17 or 21 is sampling the input signals.

At the time that the waveform B applied to the differential amplifier modulator 17 renders the modulator 17 operative by coupling it to the current source 31, a charge differential amplifier 29 also is rendered effective to complete a charging path from the current source 33 through the differential amplifier 29 to a sawtooth-forming capacitor 35. The capacitor 35 also is shunted by the emitter-collector junction of a PNP shunting transistor 36, which, on the previous half-cycle of the waveforms A and B, was rendered conductive to discharge the capacitor 35. This causes substantially the potential of the B+ supply applied to an input terminal 37 to be applied to the reference input of the modulating differential amplifier 17 at the start of the pulse interval during which the differential amplifier 17 is enabled for operation. Control of the conduction of the transistor 36 is effected by the discharge differential amplifier 28, and it is to be noted that the transistor 36 is rendered conductive at the time that the charge differential amplifier 29 presents an open circuit to the charging path for the capacitor 35. The transistor 36 then is rendered nonconductive during the half-cycle of the waveforms A and B when the charge differential amplifier 29 completes the charging path for the capacitor 35 through the current source 33.

In the example presently under consideration, the positive half-cycles of the waveform A operate to cause the modulating pulse differential amplifier 27 effective to provide a current source for the differential amplifier 17. At the same time, the charge amplifier 29 is effective to provide a charging path for the capacitor 35. Thus, the capacitor 35 commences charging, in accordance with waveform C shown in FIG. 2, from the B+ positive potential toward ground potential to form the negative-going sawtooth ramp illustrated in waveform C of FIG. 2. The maximum positive potential present on the ramp of waveform C at the beginning of each pulse interval during which the "I" modulating differential amplifier 17 is enabled, causes the differential amplifier 17 to commence each of the time intervals during which it controls the output with the same output signal state. When the reference voltage applied to the reference input of the differential amplifier 17 by the decreasing ramp provided by the capacitor 35 equals the potential of the signal applied to signal input of the differential amplifier 17 from the driver 16, the differential amplifier 17 changes state, with the time of this change of state varying in accordance with the amplitude of the signal present from the driver 16. Thus, modulation of the trailing edge of the output pulse produced by the "I" modulator 17 is provided, with the leading edge occuring at the beginning of the time interval as determined by the oscillator 23 and differential amplifier 27.

On the next half-cycle waveform A the charging path for the capacitor 35 is opened by the change of state in the charge differential amplifier 29, which then is effective to couple the current source 33 in series with a second charge storage capacitor 39. A PNP transistor 40 shunts the capacitor 39 in a manner similar to the manner in which the transistor 36 shunts the capacitor 35, with the conduction of the transistor 40 being controlled by the opposite output of the discharge differential amplifier 28. Also, on this next half-cycle of waveform A, the discharge amplifier 28 is rendered effective to cause the transistor 36 to become conductive, discharging the capacitor 35, causing the potential applied to reference input of the differential amplifier 17 once again to rise to B+. At the same time, however, the differential amplifier 17 is rendered inoperative by output of the modulator pulse differential amplifier 27, which now causes the current source 31 to be coupled to the differential amplifier 21 (the second half-cycle of waveform D). The waveform E represents the sawtooth reference signal applied to the reference input of the modulating differential amplifier 21 by the capacitor 39, and a comparison of waveforms C and E indicates that each is effective during alternate half-cycles of the waveform A of the oscillator 23. By controlling the operation of the differential amplifiers 27, 28 and 29 in parallel, the modulation of the trailing edge of the pulses is effected with minimum phase shift.

Thus, each half-cycle of the waveform A produced by the oscillator 23 establishes a time-division-multiplex interval for the modulator circuit shown in FIG. 1, with the "I" modulator differential amplifier 17 being effective to control the output signals during the positive half-cycles of the waveform A from the oscillator 23 and the "Q" modulating differential amplifier 21 being effective to control the output signals during the negative half-cycles of the waveform A. The "Q" modulator differential amplifier 21 produces pulse-width modulated pulses during each of the time intervals at which it is effective to control the output in the same manner described above for the operation of the "I" differential amplifier 17.

The outputs of the differential amplifiers 17 and 21 are coupled, respectively, to adder differential amplifiers 42 and 44, corresponding outputs of which are coupled in common to provide a continuous sequence of pulse-width modulated, time-division-multiplexed pulses, corresponding to the color information present on the "I" and "Q" outputs of the color television camera 12. Alternating ones of this sequence of pulses correspond to the two different channels or hues of color information, the pulse-width modulation corresponding to the saturation of the respective hue. This sequence of pulses for an arbitrarily chosen signal is illustrated in waveform F of FIG. 2.

Since the signals obtained from the output of the modulator are to be used in an EVR system which utilizes a player operating in conjunction with a color television receiver, it is necessary to provide for a horizontal retrace interval to establish the raster required to provide the signals to the television receiver. Thus, the output of the oscillator 23 also is supplied to a synchronizing circuit 45, which includes pulse counters or frequency dividers responsive to a number of pulses or cycles of the signal obtained from the output of the oscillator 23 equaling the time interval for a horizontal scan to produce a retrace pulse over a lead 46 to the EVR recorder 10, initiating a retrace of the recording mechanism to begin the next horizontal line. At the same time, a pair of synchronizing control pulses 49 and 50 are produced, with the pulse 50 being approximately twice the duration of the pulse 49. Both of the pulses 49 and 50 are of a length extending over several cycles of waveform A produced by the oscillator 23.

The synchronizing control pulse 50 is applied to both of the driver circuits 16 and 19 and is effective throughout its duration to cause the driver circuit 19 to be rendered insensitive to the input signals applied to it over the lead 15 from the camera 12. The driver circuit 19 for the duration of the pulse 50 then provides an output which resembles a minimum or "O" output to the modulator differential amplifier 21. This output is sufficiently high, so that no output pulse is produced by the modulator amplifier 21.

The synchronizing control pulse 49, which is approximately half the duration of the pulse 50, is applied to the driver circuit 16 in addition to the pulse 50; and during the time that both the pulses 49 and 50 are present, the driver circuit 16 provides an output signal such that the modulator differential amplifier 17 produces no output signals. The time interval of the pulse 49 is approximately equal to the retrace interval for the EVR color recorder 10.

Upon termination of the pulse 49, the pulse 50 is effective in the driver circuit 16 to produce an output signal which overrides the signals present on the lead 14 which is indicative of a maximum amplitude or maximum saturation "I" color signal. Thus, the output of the "I" modulator differential amplifier 17 during the last half of the pulse interval 50 is in the form of fully modulated pulses which are indicated in waveform F by the first two "I" pulses shown. At the same time, an examination of waveform F shows that no "Q" information is provided between I-synchronizing pulses. The first portion of the waveform F is recorded in the EVR color recorder 10 at the beginning of each horizontal line of information. This portion then may be subsequently utilized by an EVR player to provide the proper phase synchronization of the signal, so that the demodulated "I" and "Q" information is supplied to the proper utilization channels of the receiver.

Figure 3:
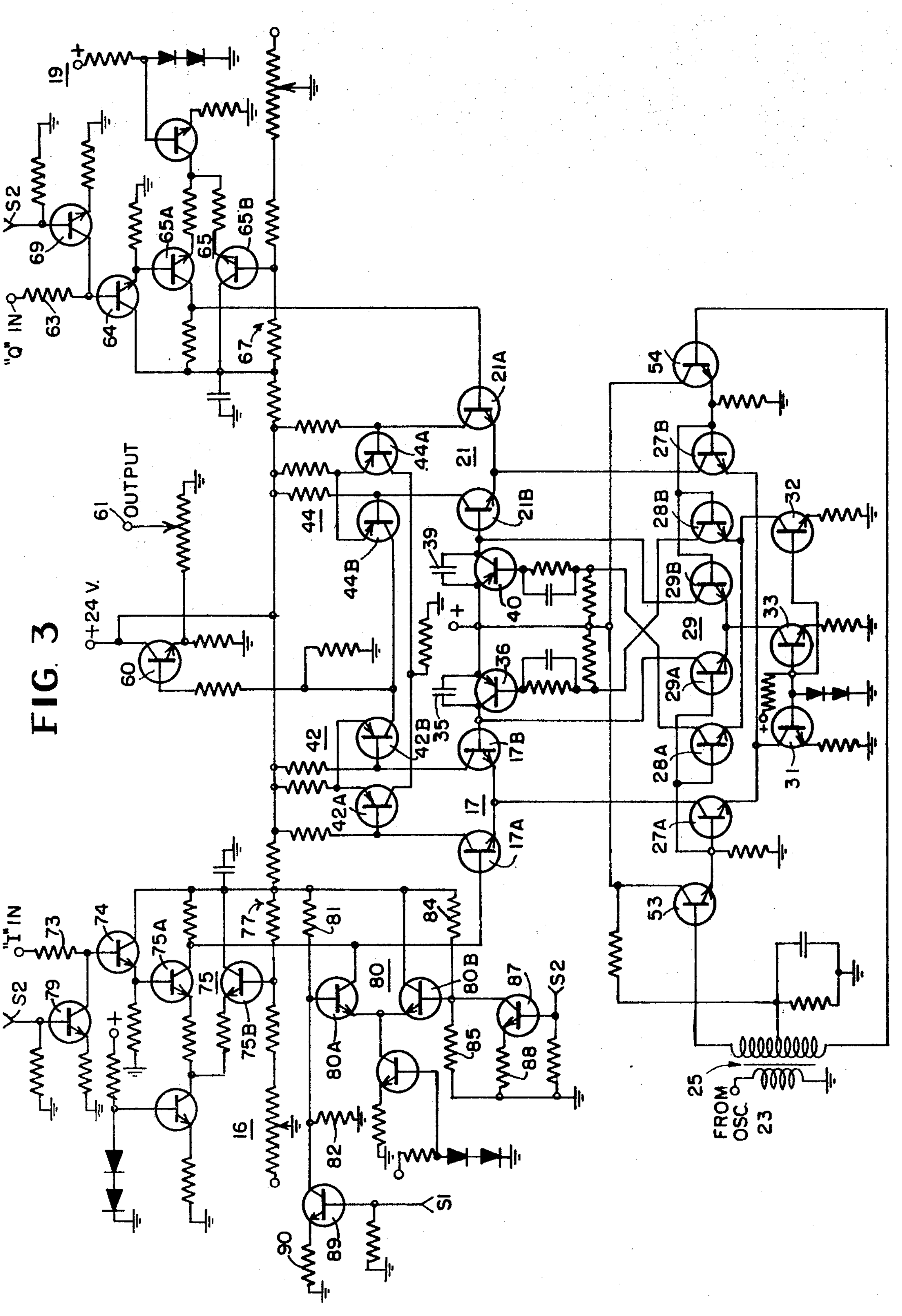
FIG. 3 is a detailed schematic diagram of the circuit shown in FIG. 1.

Referring now to FIG. 3, there is shown a detailed schematic diagram of the modulator and control system portion of the circuit shown in FIG. 1. The circuit elements shown in FIG. 3 have been provided with the same reference numerals as corresponding circuit elements shown in FIG. 1. The differential amplifiers each include a pair of transistors, with the transistors being labeled with the same reference numerals used in FIG. 1 followed by A or B to designate the two transistors of the differential amplifier. For example the "I" modulator differential amplifiers 17 includes a pair of NPN transistors 17A and 17B, the emitters of which are connected in common to the collector of a transistor 27A which constitutes one of the two transistors of the modulator pulse differential amplifier 27.

The emitters of the differential amplifier transistors 27A and 27B are coupled in common to the collector of a current source transistor 31. The switching control signals for the differential amplifiers 27, 28 and 29 shown in FIG. 3 are obtained from the opposite ends of the secondary winding of the transformer 25 through a pair of emitter followers 53 and 54, respectively, for the two sides of the differential amplifiers 27, 28 and 29. Whenever the emitter follower transistor 53 is rendered conductive, the transistors 27A, 28A and 29A also are rendered conductive, with the corresponding transistors 27B, 28B and 29B being rendered nonconductive. Similarly, whenever the emitter follower transistor 54 is rendered conductive on the opposite half-cycles of the waveform A, the transistors 27B, 28B and 29B are rendered conductive, with the transistors 27A, 28A and 29A being rendered nonconductive, to effect the switching operations described above in conjunction with FIG. 1 for the differential amplifiers 27, 28 and 29.

Consider for the moment the situation when the transistors 27A, 28A and 29A are rendered conductive, thereby enabling the "I" modulator differential amplifier 17 for operation to provide the output signals for the modulator circuit shown in FIG. 3. At the beginning of the half-cycle when the transistor 53 is rendered conductive, the charge on the capacitor 35 is at its maximum positive potential and is applied to the base of the transistor 17B of the differential amplifier 17. This charge is more positive then any signal corresponding to the "I" color information signal applied to the base of the transistor 17A. As a consequence, the transistor 17B is rendered conductive, with the transistor 17A being nonconductive; so that the PNP differential amplifier 42 operates with the transistor 42B being rendered conductive and the transistor 42A being nonconductive.

This causes relatively a positive potential to be applied to the base of a NPN output transistor 60 to render the transistor 60 conductive, causing a positive output pulse to appear on an output terminal 61, which in turn is coupled to the input of the EVR color recorder 10 as shown in FIG. 1. As described previously in conjunction with the description of operation of the circuit shown in FIG. 1, the bias applied to the base of the transistor 17B decreases in accordance with the waveform C of FIG. 2. When it drops to a point equal to the potential applied to the base of the transistor 17A corresponding to the input signal color saturation information for the "I" color channel, the state of conduction of the differential amplifier 17 switches, with the transistor 17A being rendered conductive and the transistor 17B being rendered nonconductive. This, in turn, results in the transistor 60 being rendered nonconductive, causing the output pulse to drop to near ground potential, thereby defining the trailing edge of the pulse-width modulation during the time-division-multiplex interval in which the differential amplifier 17 controls the output.

Similarly, on the next half-cycle of operation, as determined by the subsequent half-cycle of the signal (waveform A) provided by the master frequency oscillator 23, the differential amplifier 21 controls the output through the other adder differential amplifier 44, including the PNP transistors 44A and 44B. The collectors of the transistors 42B and 44B are connected together at a common terminal and provide the input signals to the transistor 60, constituting the output transistor of the adder circuit. When the differential amplifier 17 is rendered inoperative by the modular pulse differential amplifier 27, both of the transistors 42A and 42B of the differential amplifier 42 are rendered nonconductive; so that the transistor 44B controls the output signals applied to the base to the transistor 60. Similarly, when the differential amplifier 21 is rendered inoperative or is disabled by the opposite state of the differential amplifier 27, the transistors 44A and 44B are rendered nonconductive throughout the pulse interval; so that the transistor 42B controls the output signals applied to the base of the transistor 60.

The "I" and "Q" driver circuits 16 and 19 are similar, but the driver circuit 19 is the simpler of the two because of the manner in which the circuit is operated in response to the synchronizing control pulses 49 and 50 obtained from the synchronizing circuit 45. As a consequence, the driver 19 for the "Q" color channel is considered first. This driver is shown in the upper right-hand portion of FIG. 3, and the "Q" input signals present on the lead 15 shown in FIG. 1 are applied through a coupling resistor 63 to the base of an NPN emitter follower amplifier 64. The emitter follower 64 then drives one side of a differential amplifier 65, including an input transistor 65A and a reference transistor 65B. The bias for the transistor 65B is obtained from a voltage divider shown generally at 67, with the voltage divider 67 also providing the operating potential for the collectors of the transistors 64, 65A, and 65B.

In the absence of any input signals or a "no signal" condition at the input terminal coupled to the base of the transistor 64, the bias present on the differential amplifier transistors 65A and 65B is such that the potential applied to the input on the base of the transistor 21A of the "Q" modulator differential amplifier 21 is at a level substantially equal to the midpoint of the voltage supplied by the sawtooth ramp to the base of the transistor 21B. As a consequence, the differential amplifier 21, changes from a state in which the transistor 21B is conductive to that where the transistor 21A is conductive approximately at the midpoint of the ramp of the waveform E. This corresponds to the midpoint of the pulse interval alloted to the "Q" information channel by the modulator pulse differential amplifier 27.

The "Q" information then supplied to the base of the transistor 64, and from there to the base of the transistor 65A, then renders the transistor 65A more or less conductive to cause the bias on the base of the transistor 21A in response to Q input signals to become either more or less positive than this "no signal" condition. For negative going "Q" information on the Q-axis of the color signal, the transistor 64 is rendered less conductive. This, in turn, reduces the conductivity of the transistor 65A causing the potential applied to the base of the transistor 21A to rise. From an examination of waveform E shown in FIG. 2, a rise in the signal input potential results in a shorter period of conduction of the transistor 21B.

On the other hand, for increasing or positive-going input Q signals applied to the base of the transistor 64, the potential applied to the base of the transistor 21A is reduced, thereby resulting in a longer duration or wider pulse at the output of the transistor 21B and consequently, the output from the transistor 60 applied to the terminal 61. In this manner, the output of the transistor 60 during the time interval that the differential amplifier 21 is effective to control that output corresponds to width-modulated pulses conveying the necessary saturation information to enable recovery of the information in subsequent utilization circuits.

During the operation just described, the DC bias voltage at the base of the transistor 64 is approximately half the supply voltage and is in approximate balance with the voltage provided by the voltage divider 67 on the base of the transistor 65B.

During the retrace and phase synchronizing pulse-forming portion of the cycle of operation of the circuit shown in FIG. 3, the pulse 50 is applied to the base of an NPN transistor 69 to render that transistor conductive. When this occurs, a predetermined amount of current flows through the collector-emitter path of the transistor 69, with the amplitude of this current being determined by the amplitude of the pulse 50 and the value of the resistor connected between ground and the emitter of the transistor 69. This current flow causes a drop across the series input resistor 63, thereby lowering the value of the voltage applied to the base of the transistor 64. Consequently, the voltage applied to the base of the transistor 65A is lowered with respect to the voltage applied to the base of the transistor 65B. The amount by which the voltage on the base of the transistor 65A is lowered is sufficient to cause the total current supplied by the current source transistor to the differential amplifier 65 to flow through the transistor 65B. This effectively opens the signal channel; so that any information, noise, or the like which is present on the "Q" input applied through the resistor 63 to the base of the transistor 64 has no affect on the operation of the circuit during the presence of the synchronizing pulse 50. The potential applied to the base of the transistor 21A then is a maximum positive potential. As a result, the transistor 21B is prevented from being rendered conductive during any portion of the sawtooth reference signal applied to the base thereof from the capacitor 39. The transistor 44B then is cut off, which in turn the output 60 transistor to be cut off during the entire "Q" time-division-multiplex intervals when the synchronizing control pulse 50 is applied to the base of the transistor 69. Upon termination of the pulse 50, the transistor 69 is rendered nonconductive; and the circuit operates in the manner described previously.

The driver circuit 16, operating in response to the "I" channel input pulses obtained over the lead 14 from the camera 12, includes a differential amplifier 75 supplied with the "I" input signals through an emitter follower 74. The operation of the differential amplifier 75, in conjunction with the emitter follower 74, is substantially the same in response to input signals as the operation of the differential amplifier 65 described in conjunction with the "Q" driver circuit 19. The output signals present on the collector of the transistor 75A of the differential amplifier 75 are applied to the base of the transistor 17A in the modulating differential amplifier 17. Similarly, the pulse 50 is applied to the base of an NPN transistor 79 (comparable to the transistor 69) to effectively open the "I" signal channel in the same manner described previously in conjunction with the differential amplifier circuit 65 when the transistor 69 is rendered conductive by the pulse 50.

In order to produce the phase-synchronizing signal portion shown by the first four time division intervals of the waveform F in FIG. 2, a second differential amplifier 80 including a pair of NPN transistors 80A and 80B is provided in the driver circuit 16. The collectors of the transistors 80A and 80B are connected in tandem with the collectors of the transistors 75A and 75B of the differential amplifier 75. The reference potential applied to the bases of the transistors 80A and 80B from the voltage divider 77 is applied across further resistors 81 and 82, the junction of which is coupled to the base of the transistor 80A to provide a biasing potential thereto. This reference potential also is coupled across a pair of transistors 84 and 85 to provide a biasing potential on the base of the transistor 80B.

The relative values of the transistors 81, 82 and 84, 85 are selected so that a more positive reference potential is applied to the base of the transistor 80B than is applied to the base of the transistor 80A. Thus, the transistor 80B normally is biased into full conduction, with the transistor 80A being cutoff. As a consequence during normal signal reception, with the driver circuit 16 supplying the "I" color signals to the base of the transistor 17A, the differential amplifier circuit 80 has no affect on the operation of the circuit since the collector of the nonconductive transistor 80A is coupled in tandom with the collector of the driver output transistor 75A.

When the synchronizing control pulse 50 is applied to the base of the transistor 79 to render the transistor 74 and 75A nonconductive, the same pulse is applied to the base of an NPN transistor 87, the collector of which is connected to the base of the transistor 80B and the emitter of which is coupled through a resistor 88 to ground to shunt or lower the bias on the base of the transistor 80B. At the same time, however, that the pulse 50 is initially is applied to the bases of the transistors 79 and 87, the shorter duration synchronizing control pulse 49 is applied to the base of an additional transistor 89, the collector of which is connected to the base of the transistor 80A and the emitter of which is connected through a resistor 90 to ground. The relative values of the resistors 88 and 90 are chosen to maintain the state of conduction of the transistor differential amplifier 80 which previously has been described, with the transistor 80A being nonconductive and the transistor 80B being conductive.

Upon termination of the pulse 49, however, the transistor 89 is rendered nonconductive, but the transistor 87 continues to be conductive shunting the base of the transistor 80B through the resistor 88 to ground. The value of the resistor 88 is chosen to be such that with the transistor 89 nonconductive, the base of the transistor 80A is biased more positively than the base of the transistor 80B. The transistor 80A then is driven into full conduction, with the transistor 80B being rendered nonconductive. When the transistor 80A is rendered conductive, the potential applied to the base of the transistor 17A drops to near ground potential causing a full maximum pulse-width-modulating signal to be obtained from the collector of the transistor 17B of the modulating differential amplifier 17. This produces the full pulse-width-modulated pulses indicated in the first two "I" pulse intervals of the waveform F.

Upon termination of the control pulse 50, the transistor 87 once again becomes nonconductive, and the original condition of operation of the differential amplifier 80 resumes, with the transistor 80A being nonconductive. The circuit once again is responsive to the input signals applied to the base of the transistor 74 and present on the collector of the transistor 75A of the differential amplifier 75. The system then responds on alternate half-cycles of the output of the oscillator 23 to switch between the modulator differential amplifiers 17 and 21, to apply output signals through the transistor 60 in the form of a sequence of pulse-width-modulated, time-division-multiplexed pulses. Alternate ones of these pulses represent the "I" and "Q" hues of the color signal, and the width of the modulation is representative of the color saturation information necessary to cause the EVR color recorder to record the information in a proper form for subsequent utilization.

Although the foregoing description has been made in conjunction with the application of "I" and "Q" color signals as the two color signals to be processed by the circuit, it should be apparent to these skilled in the art that color signals lying along axes other than these may be utilized, the only requirement being that the final utilization equipment in the player and television receiver is capable of properly processing whatever color information signals are recorded by the EVR color recorder 10. The "I" and "Q" signals are chosen for the purposes of this illustration since the maximum visual acuity of colors lies along the "I" axis, with the "Q" axis being in quadrature therewith. Thus, these are the most desirable axes to utilize for producing the color information to be recorded in the recorder 10.

It also should be noted that it is not necessary to use a television camera as the primary color signal source, but that color film run through a projector can be picked up by a multiple channel flying spot scanner to yield the brightness, "I" and "Q" output signals. Or the primary color source could be video tape player information, or the like.

We claim:

1. A modulator for producing pulse-width modulated, time-division-multiplexed pulses from at least first and second sources of signals to be modulated, including in combination:

first and second comparator circuits, each having a signal input and reference input and producing a first output with the magnitude of the signal applied to the signal input having a predetermined relationship with respect to the magnitude of the potential applied to the reference input, and producing a second output with the magnitude of the signal input equaling the magnitude of the reference potential applied to the reference input;

means for coupling the first source of signals to the signal input of the first comparator circuit and the second source of signals to the signal input of the second comparator circuit;

clock circuit means producing a clock control signal at a predetermined frequency;

control means having first and second complementary outputs coupled with the first and second comparator circuits, the outputs of the control means each being capable of assuming either of first and second states, with a control means output in the first state causing the comparator circuit coupled thereto to produce said second output thereof and with a control means output in the second state enabling the comparator circuit coupled thereto to produce said first comparator output;

means for applying the clock control signal to the control means for changing the states of the first and second outputs thereof in response thereto at a predetermined rate;

means coupled with the reference inputs of the first and second comparator circuits for producing a reference potential varying from an initial value at the beginning of each time interval established by a change of state of the outputs of the control means at a predetermined rate toward a final value, which is selected with respect to the range of signals applied to the first and second signal inputs to cause the magnitude of the reference potential to equal the magnitude of the input signal during such a time interval; and means for combining the outputs of the first and second comparator circuits to produce said modulated signal.

2. The combination according to claim 1, wherein the first and second sources of signals are analog signals of varying amplitudes, and the first and second comparator circuits are first and second differential amplifier switch circuits, each having first and second outputs, with the first outputs thereof being coupled together to produce said modulated output signal.

3. The combination according to claim 1, wherein the first and second comparator circuits comprise first and second differential amplifier circuits, and the control means includes a third differential amplifier circuit having third and fourth outputs, with the third output coupled with the first differential amplifier and the fourth output coupled with the second differential amplifier to operate, respectively, as current sources for the first and second differential amplifiers, the means for applying the clock signals to the third differential amplifier alternately causing current to flow at a said third and fourth outputs.

4. The combination according to claim 1 wherein the means for providing the varying reference potential includes a sawtooth signal generator recycled with a change of state of the outputs of the control means.

5. The combination according to claim 4, wherein the sawtooth generator includes first and second charge storage means and a charge control differential amplifier switch means having first and second outputs thereof coupled with the first and second charge storage means, respectively, and responsive to the clock control signal for alternately providing charge paths for the first and second charge storage means in synchronism with the changes of state of the outputs of the control means; a discharge differential amplifier switch means having first and second outputs; and first and second shunt switch means coupled across the first and second charge storage means, respectively, and controlled by the respective first and second outputs of the discharge differential amplifier switch means, said discharge differential amplifier being responsive to the clock control signal for alternately rendering the first and second shunt switch means conductive to discharge the respective charge storage means.

6. The combination according to claim 5, wherein the relative phases of operation of the charge control differential amplifier and the discharge differential amplifier are such that when a charge path is provided for the first charge storage means, the second charge storage means is being shunted by the corresponding shunt switch means and vice versa, the first charge storage means being coupled with the reference signal input of the first comparator circuit and the second charge storage means being coupled with the reference signal input of the second comparator circuit.

7. The combination according to claim 5, wherein said first and second signal sources are first and second analog signals from a color camera corresponding to the color information of two different hues.

8. A system for modulating color signals provided on first and second channels corresponding to two different hues to form a sequence of pulse-width modulated and time-division-multiplexed pulses, alternating pulses in the pulse sequence representing the two different hues of information, and the pulse-width modulation of the pulses corresponding to the color saturation, including in combination:

first and second comparator circuits, each having a signal input and a reference input and producing a first output with the magnitude of the signal applied to the signal input having a predetermined relationship with respect to the magnitude of the potential applied to the reference input, and producing a second output with the magnitude of the signal input equaling the magnitude of the reference potential applied to the reference input;

means for coupling the first source of signals to the signal input of the first comparator circuit and the second source of signals to the signal input of the second comparator circuit;

clock circuit means producing a clock control signal at a predetermined frequency;

control means having first and second complementary outputs coupled with the first and second comparator circuits, the outputs of the control means each being capable of assuming either of first and second states, with a control means output in the first state causing the comparator circuit coupled thereto to produce said second output and with a control means output in the second enabling the comparator circuit coupled thereto to produce said first comparator output;

means for applying a clock control signal to the control means to change the states of the first and second outputs thereof in response thereto at a predetermined rate;

means coupled with the reference inputs of the first and second comparator circuits for producing a reference potential varying from an initial value at the beginning of each time interval established by a change of state of the outputs of the control means, at a predetermined rate, to a final value which is selected with respect to the range of signals applied to the first and second signal inputs to cause the magnitude of the reference potential to equal the magnitude of the input signal during such a time interval;

means for combining the outputs of the first and second comparator circuits to produce the modulated signals; and synchronizing signal control means responsive to the clock circuit means for overriding the first and second input signals applied to first and second comparator circuit means to produce periodically a predetermined phase-synchronizing signal portion in the modulated signal obtained from the outputs of the comparator circuits.

9. The combination according to claim 8 wherein the synchronizing signal control means supplied a first synchronizing control pulse of a first predetermined duration to the first and second comparator circuits to render the first and second comparator circuits insensitive to the corresponding input signals for the duration of said first pulse and the synchronizing signal control means provides a second control pulse of a second predetermined duration to only one of the first or second comparator circuit to which the second control pulse is applied to produce a pulse-width modulation of a predetermined width at the output thereof.

10. The combination according to claim 8, wherein the synchronizing signal control means produces a first synchronizing pulse of a first predetermined length and a second synchronizing pulse of a second, shorter predetermined length, the first comparator circuit includes a first differential amplifier, providing the first and second outputs, and having said reference input and another input, a second differential amplifier, the output of which is coupled with the other input of the first differential amplifier as the signal input thereto with the signal input for the first comparator circuit being applied to an input of the second differential amplifier, and means responsive to the first synchronizing control pulse for shunting input signals applied to the input of the second differential amplifier; and the second comparator circuit includes a third differential amplifier providing the first and second outputs and having the reference input and a signal input coupled in tandem to the outputs of fourth and fifth differential amplifiers, the fourth differential amplifier having an input signal terminal, and means responsive to the first synchronizing control pulse for shunting input signals applied to the input signal terminal thereof, the fifth differential amplifier being responsive to the first and second synchronizing control pulses for providing an output signal to the input terminal of the third differential amplifier upon termination of the second synchronizing pulse during the remainder of the first synchronizing pulse, the output signal corresponding to a predetermined width of an input signal, the fifth differential amplifier being ineffective in the presence of both synchronizing pulses and in the absence of either synchronizing pulse.

* * * * *